United States Patent
Miller et al.

(10) Patent No.: US 10,145,960 B2
(45) Date of Patent: Dec. 4, 2018

(54) SYSTEM AND METHOD FOR CELL PHONE RESTRICTION

(75) Inventors: Thomas Lee Miller, Ann Arbor, MI (US); Brian Bennie, Sterling Heights, MI (US); David Anthony Hatton, Berkley, MI (US); Doron M. Elliott, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 743 days.

(21) Appl. No.: 13/362,202

(22) Filed: Jan. 31, 2012

(65) Prior Publication Data

US 2012/0221169 A1    Aug. 30, 2012

Related U.S. Application Data

(60) Provisional application No. 61/446,124, filed on Feb. 24, 2011.

(51) Int. Cl.
*H04W 4/04* (2009.01)
*G01S 19/34* (2010.01)

(52) U.S. Cl.
CPC .............. *G01S 19/34* (2013.01); *H04W 4/04* (2013.01); *Y02D 70/00* (2018.01); *Y02D 70/144* (2018.01); *Y02D 70/164* (2018.01)

(58) Field of Classification Search
None
See application file for complete search history.

(56) References Cited

U.S. PATENT DOCUMENTS

| | | | |
|---|---|---|---|
| 5,169,051 A | 12/1992 | Noe | |
| 5,467,070 A | 11/1995 | Drori et al. | |
| 5,513,107 A | 4/1996 | Gormley | |
| 5,627,510 A | 5/1997 | Yuan | |
| 5,633,946 A * | 5/1997 | Lachinski | G01C 15/00 348/118 |
| 5,635,916 A | 6/1997 | Bucholtz et al. | |
| 5,803,043 A | 9/1998 | Bayron et al. | |

(Continued)

FOREIGN PATENT DOCUMENTS

| | | |
|---|---|---|
| CN | 101925890 A | 12/2010 |
| GB | 2273580 A | 6/1994 |

(Continued)

OTHER PUBLICATIONS

"TrekBuddy map app—User Guide".*

(Continued)

*Primary Examiner* — Jonathan M Dager
*Assistant Examiner* — Garrett F Evans
(74) *Attorney, Agent, or Firm* — Brooks Kushman P.C.; Jennifer M. Stec

(57) ABSTRACT

In at least one embodiment, a vehicle system comprising a vehicle communication module is provided. The vehicle communication module is configured to receive first global positioning system (GPS) data indicative of a location of a vehicle and to receive a first signal indicative of the vehicle being in a drive state. The vehicle communication module is further configured to transmit the first GPS data to an occupant communication device (OCD) in response to the first signal to restrict at least a portion of the operation of the OCD and to reduce power consumption of the OCD.

2 Claims, 3 Drawing Sheets

(56) References Cited

U.S. PATENT DOCUMENTS

| | | | |
|---|---|---|---|
| 5,828,319 A | 10/1998 | Tonkin et al. |
| 6,018,291 A | 1/2000 | Marble et al. |
| 6,028,537 A | 2/2000 | Suman et al. |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |
| 6,271,745 B1 | 8/2001 | Anzai et al. |
| 6,353,778 B1 | 3/2002 | Brown |
| 6,386,007 B1 | 5/2002 | Johnson et al. |
| 6,411,899 B2 | 6/2002 | Dussell et al. |
| 6,430,488 B1 | 8/2002 | Goldman et al. |
| 6,434,455 B1 | 8/2002 | Snow et al. |
| 6,434,486 B1 | 8/2002 | Studt et al. |
| 6,438,491 B1 | 8/2002 | Farmer |
| 6,518,882 B2 | 2/2003 | Johnson et al. |
| 6,574,734 B1 | 6/2003 | Colson et al. |
| 6,590,495 B1 | 7/2003 | Behbehani |
| 6,675,082 B2 | 1/2004 | Galli et al. |
| 6,679,702 B1 | 1/2004 | Rau |
| 6,690,956 B2 | 2/2004 | Chua et al. |
| 6,737,963 B2 | 5/2004 | Gutta et al. |
| 6,754,562 B2 | 6/2004 | Strege et al. |
| 6,772,061 B1 | 8/2004 | Berthiaume et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 6,952,156 B2 | 10/2005 | Arshad et al. |
| 6,998,956 B2 | 2/2006 | Dix |
| 7,006,914 B1 | 2/2006 | Cahoon |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,207,041 B2 | 4/2007 | Elson et al. |
| 7,228,213 B2 | 6/2007 | Sakai et al. |
| 7,266,438 B2 | 9/2007 | Kellum et al. |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,471,929 B2 | 12/2008 | Fujioka et al. |
| 7,505,784 B2 | 3/2009 | Barbera |
| 7,602,782 B2 | 10/2009 | Doviak et al. |
| 7,757,803 B2 | 7/2010 | Fiske et al. |
| 7,812,712 B2 | 10/2010 | White et al. |
| 7,957,773 B2 | 6/2011 | Chua et al. |
| 7,959,177 B2 | 6/2011 | Fiske et al. |
| 8,050,815 B2 | 11/2011 | Perry et al. |
| 8,131,205 B2 | 3/2012 | Rosen |
| 8,775,020 B2 | 7/2014 | Miller et al. |
| 2002/0097145 A1 | 7/2002 | Tumey et al. |
| 2002/0107032 A1 | 8/2002 | Agness et al. |
| 2003/0079123 A1 | 4/2003 | Mas Ribes |
| 2003/0134660 A1 | 7/2003 | Himmel et al. |
| 2004/0046452 A1 | 3/2004 | Suyama et al. |
| 2004/0198306 A1 | 10/2004 | Singh et al. |
| 2004/0227642 A1 | 11/2004 | Giles et al. |
| 2004/0236475 A1 | 11/2004 | Chowdhary |
| 2004/0263316 A1 | 12/2004 | Dix et al. |
| 2005/0019228 A1 | 1/2005 | Myers et al. |
| 2005/0088284 A1 | 4/2005 | Zai et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama |
| 2005/0193212 A1 | 9/2005 | Yuhara |
| 2005/0261816 A1 | 11/2005 | DiCroce et al. |
| 2006/0056663 A1 | 3/2006 | Call |
| 2006/0114101 A1 | 6/2006 | Schambeck et al. |
| 2006/0150197 A1 | 7/2006 | Werner |
| 2006/0156315 A1 | 7/2006 | Wood et al. |
| 2007/0050854 A1 | 3/2007 | Cooperstein et al. |
| 2007/0072616 A1 | 3/2007 | Irani |
| 2007/0100514 A1 | 5/2007 | Park |
| 2007/0103339 A1 | 5/2007 | Maxwell et al. |
| 2007/0120948 A1 | 5/2007 | Fujioka et al. |
| 2007/0124043 A1 | 5/2007 | Ayoub et al. |
| 2008/0133705 A1* | 6/2008 | Lemond et al. .............. 709/217 |
| 2008/0148374 A1 | 6/2008 | Spaur et al. |
| 2008/0275604 A1 | 11/2008 | Perry et al. |
| 2009/0005070 A1* | 1/2009 | Forstall .................. G01C 21/12 455/456.1 |
| 2009/0111422 A1 | 4/2009 | Bremer et al. |
| 2009/0195370 A1 | 8/2009 | Huffman et al. |
| 2009/0312901 A1 | 12/2009 | Miller et al. |
| 2010/0007479 A1 | 1/2010 | Smith |
| 2010/0035632 A1 | 2/2010 | Catten |
| 2010/0039224 A1 | 2/2010 | Okude et al. |
| 2010/0097178 A1 | 4/2010 | Pisz et al. |
| 2010/0148923 A1 | 6/2010 | Takizawa |
| 2010/0227629 A1 | 9/2010 | Cook et al. |
| 2011/0021234 A1 | 1/2011 | Tibbitts et al. |
| 2011/0032102 A1 | 2/2011 | Miller et al. |
| 2011/0039581 A1 | 2/2011 | Cai et al. |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0077032 A1 | 3/2011 | Correale et al. |
| 2011/0105082 A1 | 5/2011 | Haley |
| 2011/0257973 A1 | 10/2011 | Chutorash et al. |
| 2011/0295444 A1 | 12/2011 | Westra et al. |
| 2012/0071140 A1* | 3/2012 | Oesterling ............ H04W 4/046 455/414.1 |
| 2012/0172012 A1* | 7/2012 | Sumcad .................. H04W 4/12 455/414.1 |

FOREIGN PATENT DOCUMENTS

| | | |
|---|---|---|
| WO | 2009097042 A1 | 8/2009 |
| WO | 2011016886 A1 | 2/2011 |

OTHER PUBLICATIONS

"Why Use an External Bluetooth GPS".*

English translation of DE 199 61 619 A1, Jun. 28, 2001, 5 pages.

Patty Mattern, "Getting smarter at getting safer", University of Minnesota, UMNnews, Sep. 13, 2005, 2 pages.

English translation of the abstract for CN 101596895, Jul. 6, 2011, 1 page.

English translation of the abstract for DE 102007046270, Jul. 6, 2011, 1 page.

Chinese Office Action for corresponding Application No. 201210042906.0, dated Jul. 1, 2015, 6 pages.

Chinese Office Action for corresponding Application No. 201210042906.0, dated Mar. 28, 2016, 6 pages.

Chinese Office Action and English translation for corresponding Application No. 201210042906.0, dated Oct. 21, 2016, 10 pages.

* cited by examiner

SYSTEM AND METHOD FOR CELL PHONE RESTRICTION

CROSS-REFERENCE TO RELATED APPLICATIONS

This application claims the benefit of U.S. provisional Application No. 61/446,124 filed on Feb. 24, 2011 the disclosure of which is hereby incorporated by reference in its entirety.

TECHNICAL FIELD

Embodiments of the present disclosure generally relate to a system and method for cell phone restriction in a vehicle.

BACKGROUND

It is known to restrict cell phone usage for a driver in a vehicle. One example of an implementation that restricts cell phone usage for a driver is set forth in co-pending International Publication No. WO 2011/016886 (the '886 publication) to Miller et al. filed on May 7, 2010. The '886 publication discloses an apparatus for transmitting vehicle information to an occupant communication device (OCD). The apparatus comprises a communication module that is positioned within the vehicle. The communication device is configured to receive a transmission status signal indicative of a transmission mode for the vehicle. The communication device is further configured to transmit the transmission status signal over a wireless protocol to the OCD such that the OCD is disabled from being controlled by switches positioned thereon if the transmission mode enables movement of the vehicle.

SUMMARY

In at least one embodiment, a vehicle system comprising a vehicle communication module is provided. The vehicle communication module is configured to receive first global positioning system (GPS) data indicative of a location of a vehicle and to receive a first signal indicative of the vehicle being in a drive state. The vehicle communication module is further configured to transmit the first GPS data to an occupant communication device (OCD) in response to the first signal to restrict at least a portion of the operation of the OCD and to reduce power consumption of the OCD.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

Figure 1:
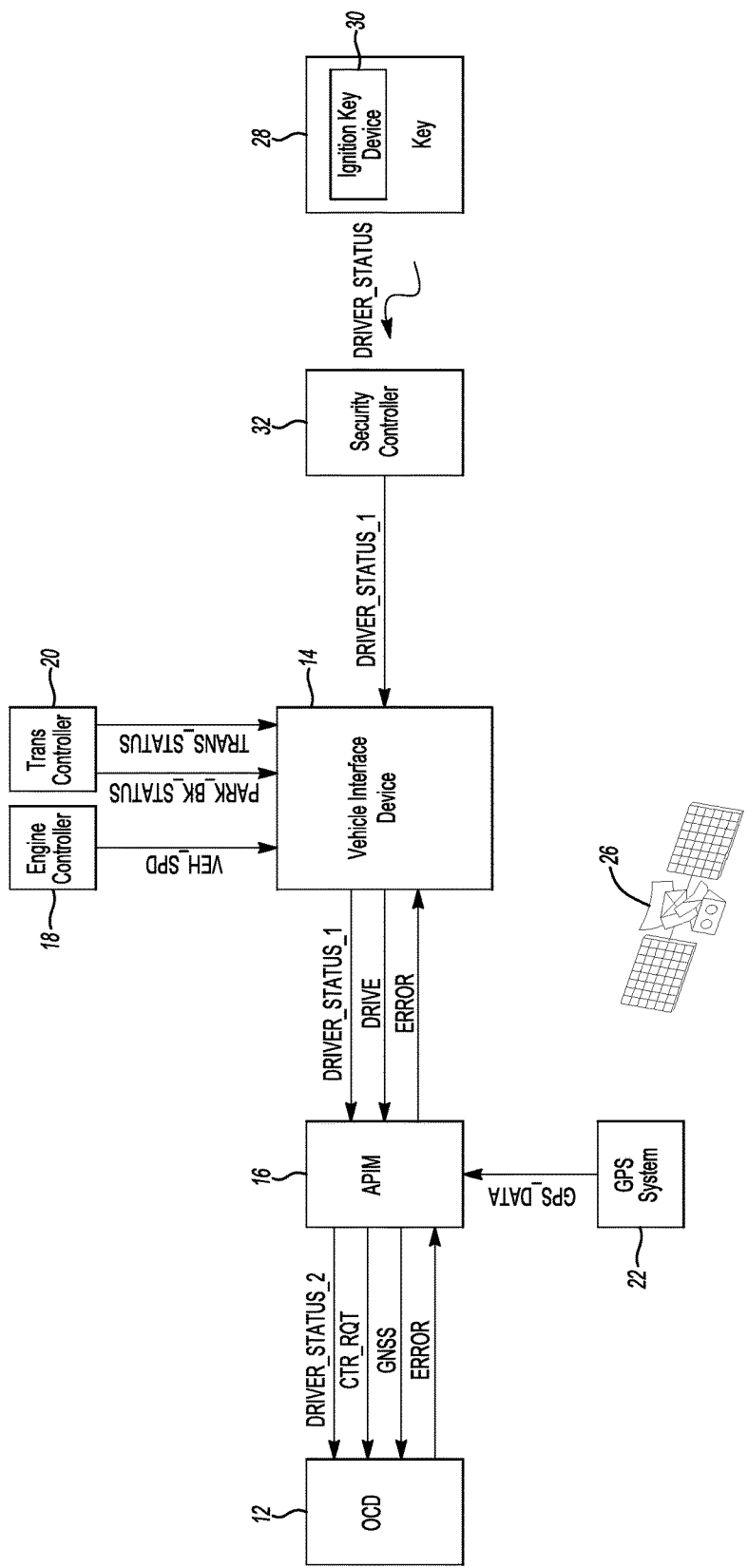
FIG. 1 depicts a system for restricting operation of an occupant communication device (OCD) in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments of the present disclosure generally provides for a system that enables global positioning coordinates for a vehicle to be transmitted from the vehicle to an occupant communication device (OCD). The OCD may include an application, which disables operation if the GPS coordinates indicate that the vehicle is moving (i.e., disables switches positioned on the OCD to prevent the driver from manually manipulating the OCD to minimize distractions). The use of GPS coordinates as provided by the vehicle may also alleviate battery consumption or increase battery life in the OCD. OCDs generally includes a GPS system (e.g., that includes hardware and/or software) to provide a location of the OCD. However, when the OCD utilizes its GPS system while moving (e.g., in a vehicle), power consumption may be increased. By providing the GPS data of the vehicle to the OCD, such a condition necessarily provides the GPS data for the OCD as well. The OCD can use the GPS data as provided by the vehicle for its own internal applications such as, but not limited to, navigation, geo-fencing and/or breadcrumbing. When the vehicle is stationary, or not in drive, the GPS data transmitted to the OCD may be filled with null data (or any other data) that would indicate that the vehicle is not moving. In this case, the OCD may enable operation since the vehicle is in a non-driving mode.

Embodiments of the present disclosure also generally provides for a system that transmits vehicle speed, transmission status, park brake status, etc. (e.g., vehicle status) to two or more OCDs in the vehicle. A first Bluetooth channel may be utilized between the vehicle and the OCD to transmit the vehicle status to a particular OCD that is paired (or assigned to the driver) (e.g., this particular OCD is detected to be in a driver zone). A second Bluetooth channel may be utilized between the vehicle and the OCD to also transmit the vehicle status to an OCD that is positioned in a passenger zone. In this case, the OCD's receive signals from the vehicle indicating which zone the particular OCD is positioned in.

As noted above, the OCD may be disabled if the vehicle is moving and the phone is detected to be driver zone. This condition may prevent the driver who has the paired OCD from switching with a passenger's OCD to get around the disabling operation imposed on the paired OCD. It is recognized that typically only one OCD is paired to the vehicle at a time. Hence, if there are multiple OCDs in the vehicle at one time, and the paired OCD is detected to be in the passenger zone and the unpaired OCD is detected to be in the driver zone, the unpaired OCD may disable its operation even though it is not paired by virtue of it receiving vehicle status information and an indication that it is in the driver zone over the second Bluetooth channel. It is recognized that each OCD in the vehicle includes an application or other suitable mechanism for disabling its operation based on the data received from the vehicle over the first Bluetooth channel and the second Bluetooth channel.

Figure 2:
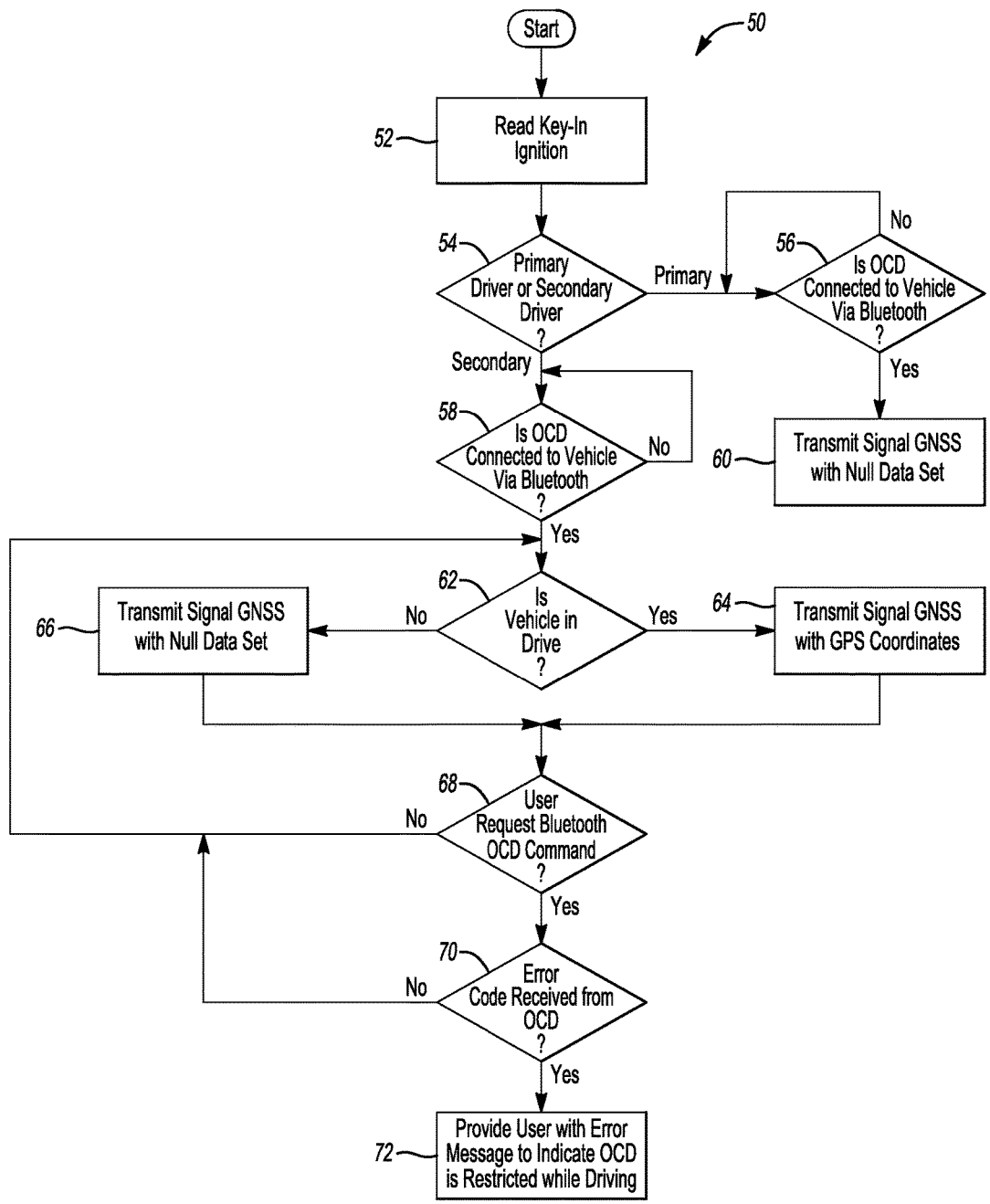
FIG. 2 depicts a method for restricting operation of the OCD in accordance to one embodiment.
Figure 3:
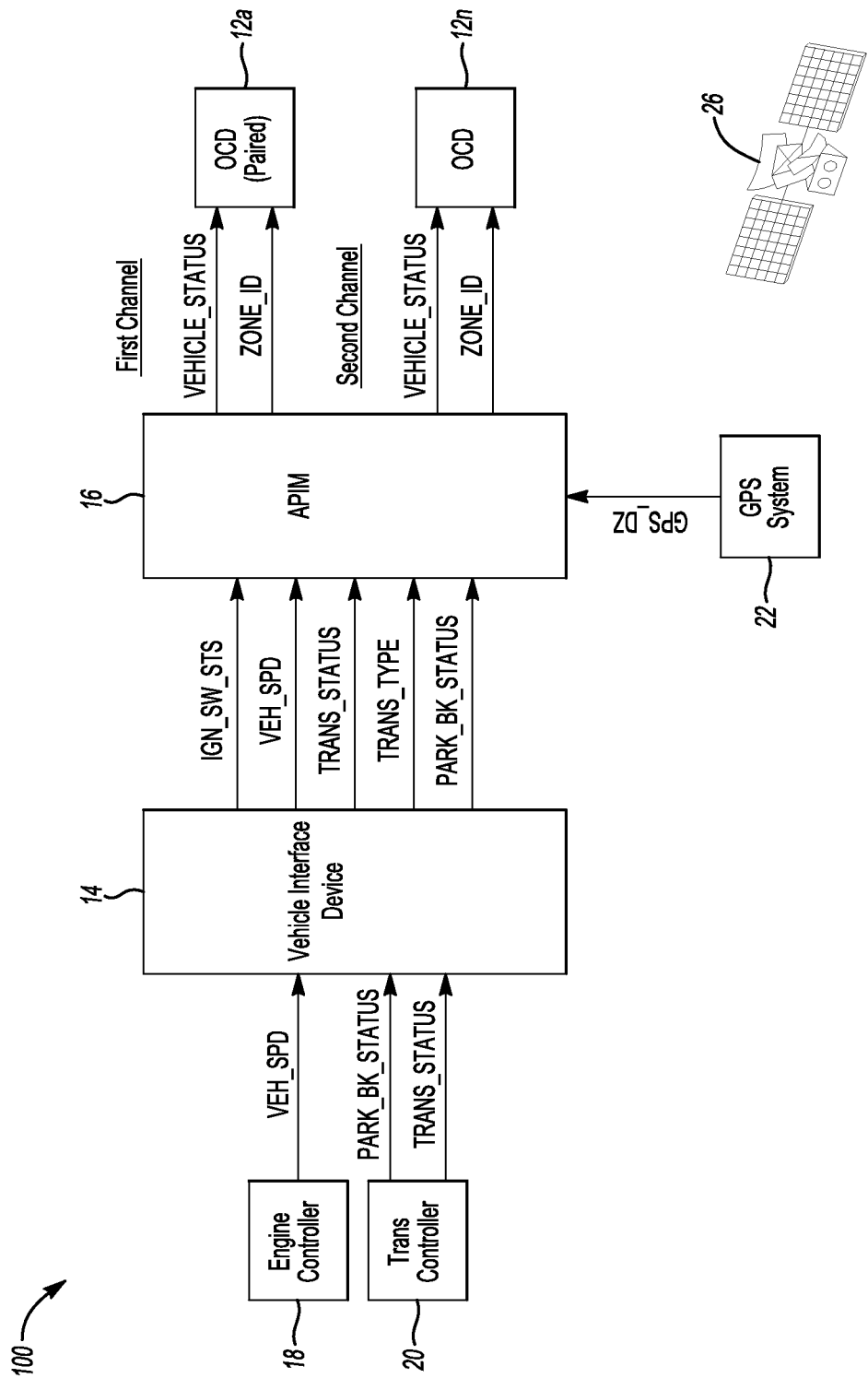
FIG. 3 depicts a system for transmitting information to the OCD via at least two Bluetooth channels in accordance to one embodiment.

Embodiments of the present disclosure as set forth herein and in FIGS. 1-3 generally describe and/or illustrate a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

FIG. 1 depicts a system 10 for restricting operation of an occupant communication device (OCD) 12 in accordance to one embodiment. The system 10 includes a vehicle interface device 14, an auxiliary protocol interface module (APIM) 16, an engine controller 18, a transmission controller 20, and a global positioning satellite (GPS) system 22. The vehicle interface device 14 may be implemented as an interface device, which provides information related to various states of vehicle functionality to the driver. For example, the device 14 may be implemented as a display and/or audible mechanism that provides status or warning messages to the driver and/or as a switch device (e.g., touch screen, voice input, or other suitable device) that enables the driver to select various vehicle functions.

The device 14, the APIM 16, the engine controller 18, and the transmission controller 20 may communicate to one another via a data communication bus. The bus may be implemented as a high/medium speed Controller Area Network (CAN) bus, Local Interconnect Network (LIN) or other suitable bus generally situated to facilitate data transfer. The particular type of bus used may vary based on the desired criteria of a particular implementation. The engine controller 18 transmits a signal VEH_SPD to the device 14. The signal VEH_SPD corresponds to the speed of the vehicle. The transmission controller 20 transmits a signal TRANS_STATUS and a signal PARK_BK_STATUS to the device 14. The signal TRANS_STATUS corresponds to the whether the vehicle transmission is in a PARK (P), Reverse (R), Neutral (N), Drive (D), or Low (L) state. The signal PARK_BK_STATUS corresponds to whether the emergency park brake is engaged. For example, if the signal PARK_BK_STATUS indicates that the park brake is engaged, such a condition would be indicative of the vehicle being in a parked state. It is recognized that a manual based vehicle transmission may not be able to provide vehicle transmission status. One manner around this constraint is to monitor the signal PARK_BK_STATUS to ascertain if the vehicle is in park.

The APIM 16 may be wirelessly coupled to the OCD 12 via a Bluetooth protocol (or channel). The OCD 12 may be implemented as a cell phone. The APIM 16 is generally part of an in-vehicle communication system (and includes at least one transmitter (not shown) and at least one receiver (not shown) which interfaces with the OCD 12 to enable voice input control to perform a function with the OCD 12 so that the driver does not have to enter data directly into the OCD 12. The APIM 16 may interface with switches (not shown) positioned within the vehicle to enable touch selection control to perform a function with the OCD 12 so that the driver does not have to enter data directly into the OCD 12. In one example, the APIM 16 may be implemented as part of the SYNC system developed by Ford Motor Company® and Microsoft®. Switches may be positioned on the APIM 16, the vehicle's steering wheel (not shown), or on the device 14.

A global positioning satellite (GPS) system 22 is operably coupled to the APIM 16 via the data communication bus. In the general, the GPS system 22 may provide information related to the location of the vehicle. The location of the vehicle may correspond to coordinate data such as the longitude and latitude of the vehicle while driven. In general, a plurality of satellites 26 communicate with the GPS system 22 to establish the location of the vehicle. For example, the GPS system 22 is capable of establishing the vehicle's position and velocity relative to the earth's position and velocity relative to the earth's surface by processing data received from the plurality of satellites 24.

As the vehicle moves latitudinally and/or longitudinally across the earth's surface, the GPS system 22 is capable of providing the position of the vehicle with reference coordinates that correspond to, among other things, the latitude and longitude on the earth's surface. The GPS system 22 transmits a signal GPS_DATA that is indicative of the GPS coordinates of the vehicle to the APIM 16.

The APIM 16 is configured to provide Global Navigation Satellite System (GNSS) information to the OCD 12. Such data may be transmitted on a wireless signal over a Bluetooth connection as signal GNSS. The signal GNSS provides information that is indicative of GPS coordinates of the vehicle as the vehicle is being driven. The device 14 transmits a signal DRIVE which is indicative of the vehicle being in a drive state. For example, in the drive state, the vehicle may be traveling a speed that is above a predetermined threshold or be in a non-park state. As noted above, such information can be ascertained by monitoring the signals VEH_SPD, TRANS_STATUS and PARK_BK_STATUS.

The APIM 16 may transmit the signal GNSS to the OCD 12 in response to the signal DRIVE indicating that the vehicle is in a drive state. The OCD 12 includes an application for disabling various operations (e.g., specific screens/actions) of the OCD 12 in response to the signal GNSS. It is recognized that the reception of the signal DRIVE may be optional in terms of it being a trigger for the APIM 16 to transmit the signal GNSS. For example, the APIM 16 may transmit the signal GNSS with the GPS coordinate data as received on the signal GPS_DATA. If the APIM 16 determines that the GPS coordinates have not changed within a predetermined time frame, the APIM 16 may provide null data on the signal GNSS to the OCD 12 to notify the OCD 12 to enable the various operations thereof. If GPS coordinates have not changed, such a condition is generally indicative of the vehicle being in a stationary state. The OCD 12 may also transmit the signal GNSS with null data in response to the signal DRIVE indicating that the vehicle is not in a drive state. It is contemplated that the APIM 16 may also transmit vehicle speed and/or transmission status to the OCD 12.

The OCD 12 uses the GPS coordinate data as provided from the vehicle to perform various features. Such a condition may preserve battery life (or reduce power consumption). For example, the OCD 12 generally includes an internal GPS (e.g., hardware and/or software) such that the OCD 12 provides its GPS data corresponding to the location of the OCD 12. When the OCD 12 is moving (e.g., when in a vehicle), the OCD 12 detects that it is moving based on it hopping from one cell phone provider tower (or ground station) to a next. Such tower hopping may serve as a trigger for the OCD 12 to provide its location data with the internal GPS. Further, a measurement of speed may occur for the OCD 12. By the OCD 12 determining its location with the internal GPS and also with the speed measurement, such a condition may increase power consumption of the OCD 12. The application in the OCD 12 may disable the internal GPS and utilize the GPS data provided from the vehicle when the vehicle is moving. The OCD 12 may utilize the GPS data from the vehicle for performing navigation, breadcrumbing, and/or geo-fencing. The utilization of the GPS data from the vehicle may increase battery life of the OCD 12 and/or increase OCD 12 battery usage with a reduced number of charging operations.

In addition, the OCD 12 can restrict operations thereof (e.g., block various screens and/or restrict hand operation of the phone) based on the GPS coordinates provided by the vehicle. Again, if the OCD 12 utilizes speed from its measurement, battery life may be decreased. When receiving data from the vehicle (e.g., GPS coordinates, or other data indicating that the vehicle is moving such as vehicle speed or transmission status), such a condition may increase battery life for the OCD 12. Again, in moments in which the vehicle is not in a drive state, the OCD 12 may utilize internal GPS coordinates. The APIM 16 may transit the signal GNSS at a pre-defined frequency (e.g., 3 times per second) to the OCD 12. By transmitting the signal GNSS at a slower sampling rate, battery life of the OCD 12 may be further increased.

While the OCD 12 is in a restricted state (i.e., vehicle is in drive), the driver may attempt to command (or request) the OCD 12 to perform a predetermined operation. In such a case, the APIM 16 transmits a signal CTR_RQT that is indicative of the driver's request. The application on the OCD 12 may not allow the driver to perform the requested operation, particularly, if the vehicle is in a restricted state (e.g., vehicle above predefined speed, vehicle is in non-park status, and/or GPS coordinates indicate vehicle is moving). If the application on the OCD 12 does not permit the requested command to be performed, the OCD 12 transmits a signal ERROR back to the APIM 16. The APIM 16 may notify the driver that the OCD 12 cannot perform the requested action while the vehicle is in the restricted state. In another implementation, the APIM 16 may transmit the signal ERROR back to the device 14 such that the device audibly and/or visually notifies the driver that the request cannot be performed (or is not supported).

OCD restriction may be imposed based on driver status. It is recognized that the above implementation may be implemented for any driver who is detected to be the driver of the vehicle. In another implementation, the vehicle may be configured to apply OCD restriction when the vehicle is moving and by using GPS coordinates based on the particular driver that is detected to be driving the vehicle. For example, the vehicle may have the OCD restriction inactive when the primary driver (e.g., parent, employer, etc.) is detected. A secondary driver such as a teenager, valet, employee, etc., on the other hand may have OCD restriction active when detected to be the driver of the vehicle. A key 28 having an ignition key device 30 is provided for wirelessly transmitting a wireless signal (e.g., signal DRIVER_STATUS) that is indicative of the status of the driver. Such status may correspond to the driver being the primary driver or the secondary driver.

A security controller 32 receives the signal DRIVER_STATUS and determines the status of the driver. The security controller 32 transmits the signal DRIVER_STATUS_1 to the device 14. The data on the signal DRIVER_STATUS provides the status of the driver to the device 14. The security controller 32 includes a passive anti-theft system (PATS) controller or a passive entry passive start (PEPS) controller. The manner in which the PATS controller or the PEPS controller receives and determines driver status based on the information provided by the key 28 is set forth in co-pending U.S. Publication No. 2011/0032102, to Miller et al. filed on Aug. 5, 2009 which is hereby incorporated by reference in its entirety.

The device 14 transmits a signal DRIVER_STATUS_1 to the APIM 16. The APIM 16 may then wirelessly transmit signal DRIVER_STATUS_2 to the OCD 12 so that the OCD 12 restricts operation if the driver is detected to be the secondary driver and the other condition(s) set forth above are met. In the event the signal DRIVER_STATUS_2 indicates that the driver is the primary driver, the OCD 12 may not impose any restrictions.

FIG. 2 depicts a method 50 for restricting operation of the OCD 12 in accordance to one embodiment. The particular order of the operations in the method 50 when performed can be in any order and are not to be limited to only being performed sequentially. The order of the operations may be modified and vary based on the desired criteria of a particular implementation.

In operation 52, the security controller 32 receives the signal DRIVER_STATUS from the key 28.

In operation 54, the security controller 32 determines whether the driver of the vehicle is the primary driver or the secondary driver based on the signal DRIVER_STATUS and notifies the various devices in the system 10 whether the driver is the primary driver or the secondary driver. If the driver is detected to be the primary driver, then the method 50 moves to operation 56. If the driver is detected to be secondary driver, then the method 50 moves to operation 58.

In operation 56, the APIM 16 determines whether an OCD 12 is electrically coupled thereto. If so, then the method 56 moves to operation 60. If not, then the method 50 remains in operation 56.

In operation 60, the APIM 16 may transmit the signal GNSS with null data to the OCD 12. The OCD 12 may allow OCD 12 operation irrespective of whether the vehicle is moving or not since the primary driver is detected. It is recognized that the APIM 16 may transmit the signal DRIVER_STATUS_2 to the OCD 12 to indicate that the driver is the primary driver and continue to provide the signal GNSS with GPS coordinate data as the vehicle is being driven. This operation allows the OCD 12 to receive such GPS data so that the OCD 12 can use the vehicle provided GPS data for its internal functions such as navigation, geo-fencing or breadcrumbing. In this case, the OCD 12 does not need to use its internal GPS to provide GPS coordinate data or determine speed of the GPS (while in the vehicle) and may utilize the GPS data from the vehicle to preserve battery life.

In operation 58, the APIM 16 determines whether the OCD 12 is electrically coupled thereto. If so, then the method 58 moves to operation 62. If not, then the method 50 remains in operation 58.

In operation 62, the APIM 16 determines whether the vehicle is in drive. The APIM 16 receives the signal DRIVE to determine if the vehicle is being driven. In another implementation, the APIM 16 may monitor the GPS coordinates as provided by the GPS system 22 to determine if the vehicle is being driven (i.e., moving). If the vehicle is being driven, then the method 50 moves to operation 64. If not, then the method 50 moves to operation 66.

In operation 64, the APIM 16 transmits the signal GNSS with GPS coordinates as provided by the GPS system 22 to the OCD 12 to disable various operations thereof. For example, the OCD 12 may not allow switches positioned thereon to be manipulated to minimize driver distraction while the vehicle is being driven. The application in the OCD 12 may continue to enable the driver to control the OCD 12 via voice control or to use the OCD 12 via voice control (e.g., in a hands-free mode).

In operation 66, the APIM 16 transmits the signal GNSS with null data. In this case, the OCD 12 can be freely used.

In operation 68, the APIM 16 determines whether a request has been made by the secondary driver for the OCD 12 to perform a predetermined operation. If a request has been made (e.g., signal CTR_RQT is transmitted to OCD 12 such that the OCD 12 performs a predetermined operation), then the method 50 moves to operation 70. If a request has not been made, then the method 50 moves to operation 62.

In operation 70, the APIM 16 determines whether an error code (e.g., via signal ERROR) has been provided by the OCD 12 in response to the OCD 12 being requested to perform the predetermined operation. If an error code has been received, then the method 50 moves to operation 72. If not, then the method 50 moves back to operation 62.

In operation 72, the APIM 16 provides the secondary driver with a notification of an error to indicate that the OCD 12 is restricted from performing the requested OCD feature.

FIG. 3 depicts a system 100 for transmitting information to at least one OCD 12 via at least two Bluetooth channels in accordance to one embodiment. In general, the system 100 is configured to transmit information to any number of OCDs 12a-12n ("12"). Such information may include, among other things, a signal VEHICLE_STATUS that is indicative of whether the vehicle is in a drive state (or is active) and a signal ZONE_ID that is indicative of a particular zone in which the OCD 12 is positioned in the vehicle.

The APIM 16 is configured to determine whether the OCD 12 is located in a driver zone and in a passenger zone. Implementations for locating the zone in which a communication device is positioned is set forth in co-pending U.S. Publication No. 2011/0301780 to Miller et al. and filed on May 27, 2011; U.S. Publication No. 2011/0300843 to Miller et al. and filed on May 20, 2011; and U.S. Publication No. 2011/0298924 to Miller et al. and filed on May 26, 2011 each of which is hereby incorporated by reference and their entirety.

The APIM 16 may transmit the signal VEHICLE_STATUS and the signal ZONE_ID to the OCD 12a over a first Bluetooth channel. An example of transmitting information between the vehicle and the OCD is set forth in the '886 publication (see above), which is hereby incorporated by reference in its entirety. The OCD 12a may be a communication device that is paired to the vehicle (i.e., to the APIM 16). For example, the OCD 12a may belong to the driver (or owner) of the vehicle. The driver in this case may program his/her OCD 12a with the APIM 16 such that the APIM 16 is configured to interface with the OCD 12a and perform predefined operations for the APIM 16. When the OCD 12a is paired to the vehicle, the vehicle (or APIM 16) may influence control over the paired OCD 12a to effectuate voice recognition/control over the OCD 12a. By transmitting VEHICLE_STATUS to the OCD 12a, such a condition may preserve battery life of the OCD 12a as the OCD 12a no longer has to rely on receiving GPS coordinates from a cell phone network in order to assess whether the OCD 12a is in a vehicle and is moving. The OCD 12a may include an application for restricting operation if the signal VEHICLE_STATUS is affirmative and if the signal ZONE_ID indicates that the driver is in the driver zone.

The APIM 16 may also transmit the signal VEHICLE_STATUS and the signal ZONE_ID to another OCD(s) 12n that are detected in the vehicle over a second Bluetooth channel. Again, the OCD 12n may include an application for receiving the signal VEHICLE_STATUS and ZONE_ID to determine when to apply restrictions. If the OCD 12n receives the signal VEHICLE_STATUS indicating that the vehicle is moving and the signal ZONE_ID indicating that the OCD 12n is in the passenger zone, then the OCD 12n will allow operation thereof. If however, the OCD 12n is transferred from the passenger zone to the driver zone and the signal VEHICLE_STATUS indicates that the vehicle is moving (or in driver (e.g., above predetermined vehicle speed and/or not in park)), then the OCD 12n will restrict its operation. Such a condition may prevent the driver from exchanging OCDs with a passenger who is locating in the passenger zone. Likewise, the OCD 12n may receive the signal VEHICLE_STATUS as opposed to receiving GPS coordinates from the cell phone provide network to preserve battery life.

While not shown in FIG. 3, it is recognized that the system 100 may also include the key 28, the ignition key device 30 and the security controller 32 as noted in connection with the system 10 so that driver status can be determined. In this case, the detection of the OCD 12a and/or 12n may be disabled when the primary driver is detected to be in the vehicle and OCD restriction may only apply when the secondary driver is detected to be in the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   providing a communication module with a transmitter and a receiver within a vehicle for communicating with an occupant communication device (OCD), the OCD including an internal global positioning system (GPS) positioned therein to provide first GPS data indicative of a location of the OCD;
   receiving, at the communication module, second GPS data indicative of a location of the vehicle;
   electrically determining, at the communication module, that the vehicle is in a drive state; and
   transmitting the second GPS data to the OCD to provide the location of the OCD instead of the first GPS data and to disable at least one switch positioned on the OCD with the second GPS data to minimize driver distraction in response to the vehicle being in the drive state.

2. The method of claim 1 wherein transmitting the second GPS data to the OCD further comprises transmitting the second GPS data to the OCD to disable the internal GPS.

* * * * *